US011076254B2

(12) United States Patent
Konagai

(10) Patent No.: US 11,076,254 B2
(45) Date of Patent: Jul. 27, 2021

(54) AUDIO PROCESSING APPARATUS, AUDIO PROCESSING SYSTEM, AND AUDIO PROCESSING METHOD

(71) Applicant: YAMAHA CORPORATION, Hamamatsu (JP)

(72) Inventor: Yusuke Konagai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/909,195

(22) Filed: Jun. 23, 2020

(65) Prior Publication Data

US 2020/0413213 A1 Dec. 31, 2020

(30) Foreign Application Priority Data

Jun. 27, 2019 (JP) ............................ JP2019-119515

(51) Int. Cl.
*H04S 7/00* (2006.01)
*G06F 3/01* (2006.01)
*G06F 3/16* (2006.01)

(52) U.S. Cl.
CPC .......... *H04S 7/303* (2013.01); *H04S 2420/01* (2013.01)

(58) Field of Classification Search
None
See application file for complete search history.

(56) References Cited

U.S. PATENT DOCUMENTS

2002/0164037 A1* 11/2002 Sekine .................... H04S 7/304 381/18
2006/0274901 A1* 12/2006 Terai ...................... H04S 1/005 381/17
2010/0053210 A1 3/2010 Kon
2017/0188172 A1* 6/2017 Horbach ................. H04S 7/304
2018/0035226 A1* 2/2018 Reijniers .............. H04R 29/001
2019/0335287 A1* 10/2019 Jung ...................... G06F 3/167
2021/0067896 A1* 3/2021 Anagnos ................ G06F 3/012

FOREIGN PATENT DOCUMENTS

JP 2010056589 A 3/2010

* cited by examiner

*Primary Examiner* — Qin Zhu
(74) *Attorney, Agent, or Firm* — Rossi, Kimms & McDowell LLP

(57) ABSTRACT

An audio processing apparatus includes a sensor configured to output a detection signal in accordance with an orientation of the sensor; a memory storing instructions; and at least one processor that implements the instructions to: sequentially generate, based on the detection signal, orientation information pieces each indicative of the orientation of the sensor; correct a current orientation information piece based on an average of a first plurality of orientation information pieces, among the sequentially generated orientation information pieces, and generate a corrected current orientation information piece; determine a head-related-transfer function in accordance with the corrected current orientation information piece; and apply a sound-image-localization processing to an audio signal based on the determined head-related-transfer function.

18 Claims, 5 Drawing Sheets

< OFFSET-VALUE CALCULATION PROCESS >

<SOUND-IMAGE-LOCALIZATION PROCESS>

< ELEVATION ANGLE θ >

<HORIZONTAL ANGLE ϕ>

AUDIO PROCESSING APPARATUS, AUDIO PROCESSING SYSTEM, AND AUDIO PROCESSING METHOD

CROSS REFERENCE TO RELATED APPLICATION

This application is based on, and claims priority from, Japanese Patent Application No. 2019-119515, filed Jun. 27, 2019, the entire contents of which is incorporated herein by reference.

BACKGROUND

Technical Field

The present disclosure relates to an audio processing apparatus, to an audio processing system, and to an audio processing method.

Background Information

When a listener listens to sound via headphones, sound images seem to be localized inside the head of the listener. A sound image is a sound source perceived by the listener. When the sound image is localized in the head of the listener, the listener may feel it to be unnatural. As a way to decrease such feelings of unnaturalness, there is known a technique for moving a sound image from the inside to the outside of the head of a listener, using a head-related-transfer function. However, this technique causes the sound image to move according to changes in orientation of the head on which the headphones are worn.

Japanese Patent Application Laid-Open Publication No. 2010-56589 (hereinafter, JP 2010-56589) discloses an apparatus that restrains a sound image from moving with changes in orientation of the head. The apparatus detects the orientation of the listener's head on the basis of a detection signal output from a sensor, such as an accelerometer or a gyro sensor (angular velocity sensor). The apparatus adjusts a head-related-transfer function according to the change in the orientation detected based on the detection signal.

However, the apparatus disclosed in JP 2010-56589 has a drawback in that the orientation detected based on the detection signal includes an error due to noise, etc., in the detection signal. Therefore, a phenomenon called "drift" occurs in which the orientation detected based on the detection signal is out of the real orientation of the head of the listener. As a result, the listener is not able to localize a sound image properly.

SUMMARY

In view of the above circumstances, the disclosure has an object to provide a technique for causing a listener to localize a sound image properly.

In one aspect, an audio processing apparatus includes: a sensor configured to output a detection signal in accordance with an orientation of the sensor; a memory storing instructions; and at least one processor that implements the instructions to: sequentially generate, based on the detection signal, orientation information pieces each indicative of the orientation of the sensor; correct a current orientation information piece based on an average of a first plurality of orientation information pieces, among the sequentially generated orientation information pieces, and generate a corrected current orientation information piece; determine a head-related-transfer function in accordance with the corrected current orientation information piece; and apply a sound-image-localization processing to an audio signal based on the determined head-related-transfer function.

In another aspect, an audio processing system includes a sensor configured to output a detection signal in accordance with an orientation of the sensor; a memory storing instructions; and at least one processor that implements the instructions to: sequentially generate, based on the detection signal, orientation information pieces each indicative of the orientation of the sensor; correct a current orientation information piece based on an average of a first plurality of orientation information pieces, among the sequentially generated pieces of orientation information, and generate a corrected current orientation information piece; determine a head-related-transfer function in accordance with the corrected current orientation information piece; and apply a sound-image-localization processing to an audio signal based on the determined head-related-transfer function.

In still another aspect, an audio processing method includes sequentially generating, based on a detection signal from a sensor indicating an orientation of the sensor, orientation information pieces each indicative of the orientation of the sensor; correcting a current orientation information piece based on an average of a first plurality of orientation information pieces, among the sequentially generated orientation information pieces, and generate a corrected current orientation information piece; determining a head-related-transfer function in accordance with the corrected current orientation information piece; and applying a sound-image-localization processing to an audio signal based on the determined head-related-transfer function.

DESCRIPTION OF THE EMBODIMENTS

Figure 1:
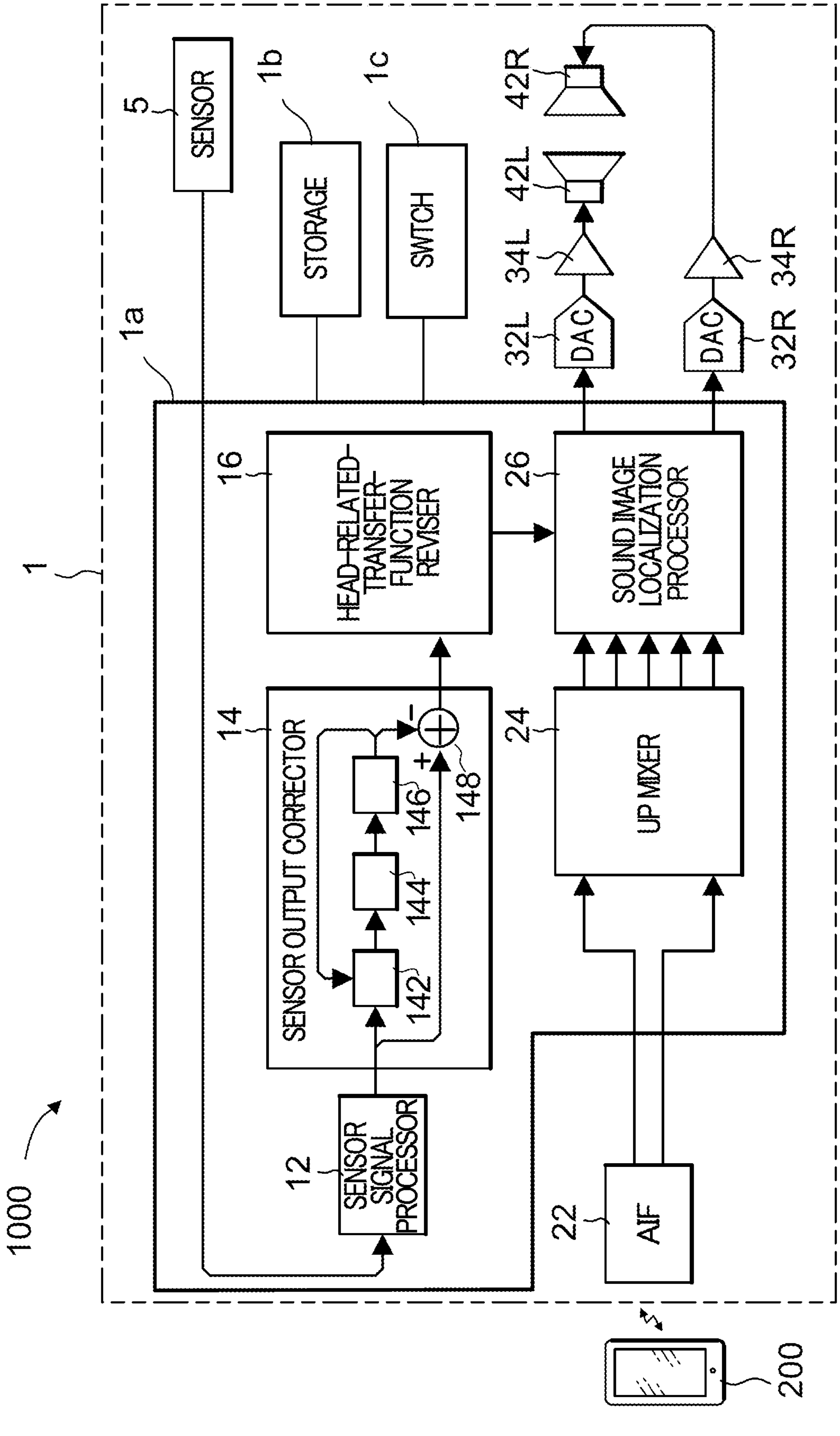
FIG. 1 is a diagram showing a configuration of headphones in an audio processing apparatus according to an embodiment.

In the following, embodiments will be described with reference to the accompanying drawings. In the drawings, dimensions and scales of each of components may be different from those of actual ones, as appropriate. There are various kinds of technical limitations in the embodiments. It is of note that the scope of the disclosure is not limited to these embodiments unless otherwise specified.

An audio processing apparatus according to the embodiment is applied to over-ear headphones, for example. The over-ear headphones include two speaker drivers and a head band. First, a technique for minimizing influence of drift will be outlined.

Figure 4:
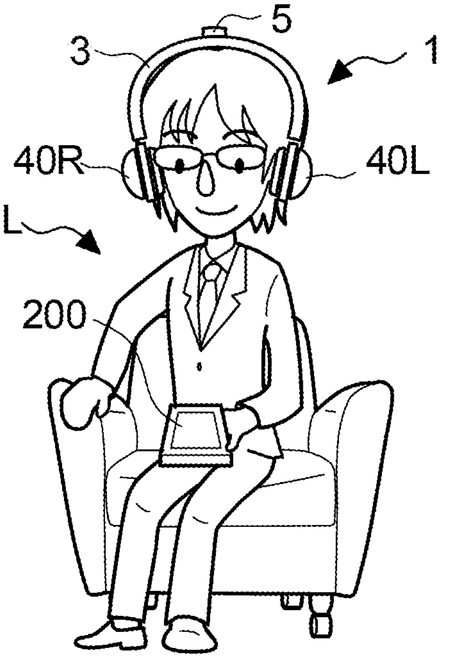
FIG. 4 is an illustration showing a case of use of the audio processing apparatus.

FIG. 4 is an illustration showing headphones 1 worn by a listener L.

The headphones 1 include headphone units 40L and 40R, a sensor 5, a headband 3, and an audio processor 1*a* (see FIG. 1). The headphone units 40L and 40R and the sensor 5 are mounted on the headband 3. The sensor 5 is a three-axis gyro sensor, for example. The sensor 5 outputs a detection signal in accordance with the posture of the sensor 5. The headphone unit 40L includes a left speaker driver 42L, which will be described later. The left speaker driver 42L converts a left channel audio signal into a sound SL. The sound SL is emitted toward the left ear of the listener L. The headphone unit 40R includes a right speaker driver 42R that is described later. The right speaker driver 42R converts a right channel audio signal into a sound SR. The sound SR is emitted toward the right ear of the listener L.

An external terminal apparatus 200 is a mobile terminal apparatus, such as a smartphone or a mobile game device. The external terminal apparatus 200 outputs audio signals to the headphones 1. The headphones 1 emit the sound based on the audio signals. The external terminal apparatus 200 may output the audio signals to the headphones 1 in two (first and second) situations.

In the first situation, the external terminal apparatus 200 outputs, to the headphones 1, the audio signals synchronizing with an image displayed on the external terminal apparatus 200. For example, the image is a video such as a game video. In this case, the listener L tends to gaze steadily at a display of the external terminal apparatus 200, for example, the center of the display where a main object (a cast member, a game character, and/or the like) is shown.

In the second situation, the external terminal apparatus 200 outputs the audio signals to the headphones 1 while displaying no image. Because, in the second situation, the external terminal apparatus 200 does not display any objects at which the listener L gazes steadily, the listener L tends to stay facing a certain direction to concentrate on listening to the music.

In either situation, the listener L who wears the headphones 1 tends to stay facing almost the same direction.

Figure 7:
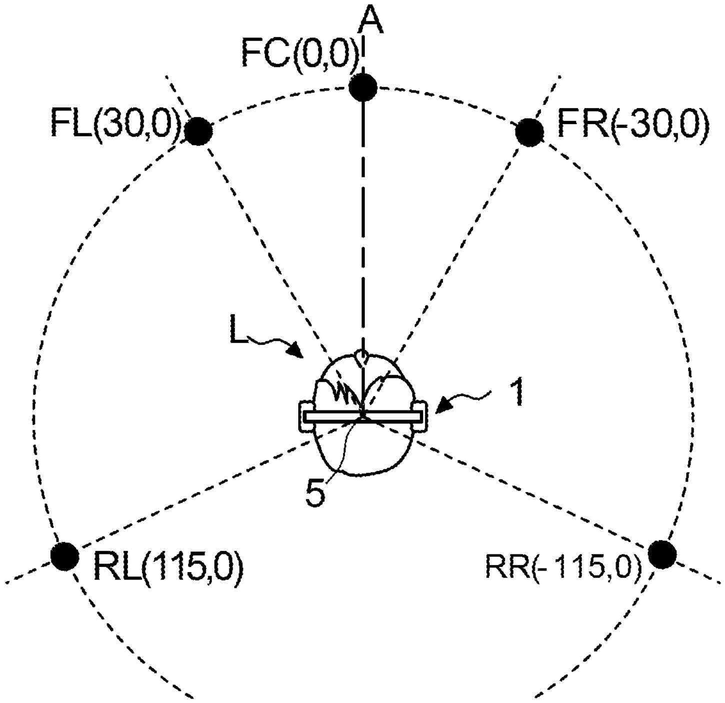
FIG. 7 is a diagram showing positions of sound images.
Figure 8:
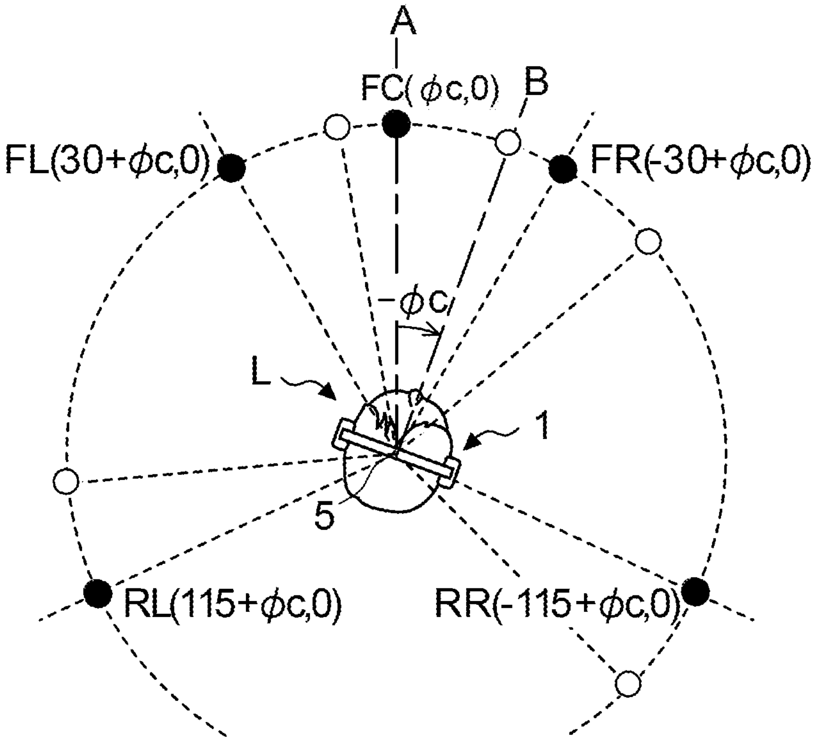
FIG. 8 is a diagram showing positions of sound images.

The sensor 5 may be mounted on a part of the headphones 1. Therefore, the detection signal that is output from the sensor 5 depends not only on the orientation of the sensor 5, but also on the posture of the listener L. A head orientation of the listener L can be calculated based on the detection signal. For example, the audio processor 1*a* calculates the head orientation of the listener L by performing calculation processing, such as rotation transformation, coordinate transformation, or integral calculation, on the detection signal. Polar coordinates, shown in FIGS. 7 and 8, are used to represent the head orientation of the listener L in a situation in which the sensor 5 is mounted at the center of the headband 3.

Figure 5:
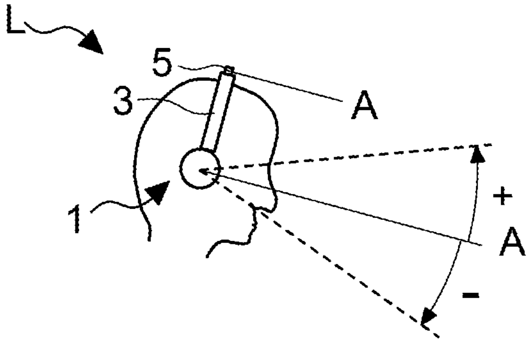
FIG. 5 is a diagram for describing the orientation of the head of a listener.
Figure 6:
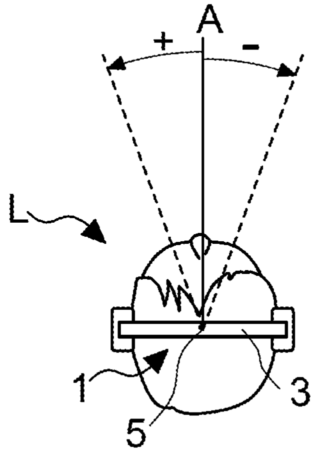
FIG. 6 is a diagram for describing the orientation of the head of the listener.

Components of the head orientation of the listener L are expressed in the polar coordinates (θ, φ). As shown in FIG. 5, "θ" (theta) denotes an elevation angle. As shown in FIG. 6, "φ" (phi) denotes a horizontal angle. It is assumed that the listener L who wears the headphones 1 stays facing in a direction A almost steadily for a certain length of time. The direction A is defined as the reference orientation (0, 0). FIG. 5 shows definitions of plus and minus of the elevation angle θ. The upward direction relative to the direction A is defined as plus (+). The downward direction relative to the direction A is defined as minus (−). FIG. 6 shows definitions of plus and minus of the horizontal angle cp. The counterclockwise direction relative to the direction A on a horizontal plane is defined as plus (+). The clockwise direction relative to the direction A on the horizontal plane is defined as minus (−).

When the listener L wears the headphones 1, the headband 3 moves according to change in the position of the head of the listener L. Since the sensor 5 is mounted on the headband 3, the head orientation of the listener L corresponds to the orientation of the sensor 5. Therefore, the head orientation of the listener L and the orientation of the sensor 5 can be detected based on the detection signal of the sensor 5. Hereinafter, the orientation detected based on the detection signal of the sensor 5 will be referred to as "detected orientation".

A real head orientation of the listener L at a certain timing is defined as (θs, φs). An error in elevation angle, that is a factor in causing drift, is defined as θe. An error in horizontal angle, that is another factor in causing the drift, is defined as φe. The detected orientation contains both elevation angle and horizontal angle errors. Therefore, the detected orientation can be expressed as (θs+θe, φs+φe).

The audio processor 1*a* can determine the real head orientation of the listener L who wears the headphones 1 by subtracting error in orientation (θe, φe) from the detected orientation (θs+θe, φs+φe). For example, the audio processor 1*a* calculates the real head orientation of the listener L who wears the headphones 1 by subtracting the error elevation angle (θe) from the elevation angle of the detected orientation (θs+θe) and by subtracting the error horizontal angle (φe) from the horizontal angle of the detected orientation (φs+φe).

The error in orientation (θe, φe) may be referred to as an orientation offset because the error in orientation (θe, φe) causes the detected orientation (θs+θe, φs+φe) to be different from the real orientation (θs, θs) of the head of the listener L.

The offset in orientation (θe, φe) in the embodiment can be calculated as follows.

As described above, the head of the listener L that wears the headphones 1 continues to generally face in the direction A. Accordingly, when a head orientation is calculated by averaging the detected orientations for a relatively long period of time in a situation in which the head stays facing almost in the direction A, the calculated orientation should to be (0, 0).

However, since the detected orientation contains the offset in orientation (θe, φe) as the error, the detected orientation is likely to be calculated as (0+θe, 0+φe), and this corresponds to the offset in orientation (θe, φe).

Therefore, the offset in orientation (θe, φe) can be calculated by averaging the detected orientations over a relatively long period of time.

In the present specification, averaging the detected orientations means to average values for each of the components of the two or more detected orientations obtained at different times.

In the embodiment, the detected orientations are sequentially output at predetermined time intervals (for example, at 0.5 second intervals), for example.

The detected orientations output within a relatively long period of time, such as 15 seconds, are accumulated. The audio processor 1*a* calculates the offset in orientation by averaging the accumulated detected orientations.

Furthermore, in the embodiment, such calculation is repeated for each time period, and the offset in orientation is updated.

The detected orientation obtained sometimes could greatly differ from an average detected orientation calculated for previous time points. In such a case, the detection signal used for calculating the detected orientation may indicate the detection result of the sensor 5 in a state in which the listener L faces in a direction extremely different from the direction A. The detection signal may include unexpected noise or the like. When such an orientation detected in an unusual situation is used in averaging processing for calculating the offset in orientation, the reliability of the orientation offset calculated in the averaging processing is degraded. In the embodiment, when the difference between the latest detected orientation and the average offset accumulated previously is equal to or greater than a threshold value, the latest detected orientation is not used for the averaging processing.

It should be noted, however, that such latest detected orientation may be used in the averaging processing when a weighting coefficient for the latest detected orientation is set to be less than a weighting coefficient for the other detected orientations.

As described above, the headphones 1 calculates the head orientation of the listener L by subtracting the offset in orientation (θe, φe) from the detected orientation (θs+θe, φs+φe) calculated at a certain timing, to determine a head-related-transfer function based on the calculated orientation.

In the following, a specific configuration of the headphones 1 that determine the head-related-transfer function in the above manner will be described.

FIG. 1 is a block diagram showing the electrical configuration of the headphones 1. Furthermore, FIG. 1 shows an audio processing system 1000 that includes the headphones 1 and the external terminal apparatus 200. The external terminal apparatus 200 is an example of a terminal apparatus. The headphones 1 include, the audio processor 1*a*, a storage 1*b*, a switch 1*c*, the sensor 5, a DAC 32L, a DAC 32R, an amplifier 34L, an amplifier 34R, a speaker driver 42L, and a speaker driver 42R. The switch 1*c* receives an operation input of the listener L. The storage 1*b* is a known recording medium, such as a magnetic recording medium or a semiconductor recording medium. The storage 1*b* is, for example, a non-transitory recording medium. The storage 1*b* includes one or a plurality of memories that store programs executed by the audio processor 1*a* and various types of data used by the audio processor 1*a*. Each of the programs is an example of instructions. The audio processor 1*a* includes at least one processor. The audio processor 1*a* functions as a sensor signal processor 12, a sensor output corrector 14, a head-related-transfer-function reviser 16, an AIF 22, an upmixer 24, and a sound-image-localization processor 26, by executing the program in the storage 1*b*.

The AIF (Audio Interface) 22 receives, from the external terminal apparatus 200, digital audio signals wirelessly, for example. The AIF 22 may receive the audio signals from the external terminal apparatus 200 by wire. The AIF 22 may receive analog audio signals. In a case of receiving the analog audio signals, the AIF 22 converts the received analog audio signals into digital audio signals. The audio signals include stereo signals of two stereo channels.

The audio signals are not limited to signals expressive of human speech. The audio signals may be any signals indicative of sound audible by humans. The audio signals may also be signals generated by performing processing, such as modulation or conversion, on these signals. The audio signals may be analog or digital.

The AIF 22 supplies the audio signals of two channels to the upmixer 24.

The upmixer 24 converts the audio signals of two channels to audio signals of three or more channels. For example, the upmixer 24 converts the audio signals of two channels to audio signals of five channels. The five channels include a front left channel FL, a front center channel FC, a front right channel FR, a rear left channel RL, and a rear right channel RR, for example.

The upmixer 24 converts the two channels to the five channels because an out-of-head localization is more likely to be realized due to surround feeling (so-called wrap-around feeling) and sound separation feeling due to the five channels. The upmixer 24 may be realized by upmix circuitry. The upmixer 24 may be omitted. When the upmixer 24 is omitted, the headphones 1 processes the audio signals of two channels. The upmixer 24 may convert the audio signals of two channels to audio signals of more than five channels, such as seven channels or nine channels.

The sensor signal processor 12 is an example of a generator. The sensor signal processor 12 acquires the detection signal of the sensor 5. The sensor signal processor 12 executes calculations using the detection signal to detect a head orientation of the listener L, i.e., the detected values of orientations at 0.5 second intervals, for example. The sensor signal processor 12 outputs orientation information indicative of the detected values at 0.5 second intervals. The orientation information includes values indicative of the elevation angle and the horizontal angle. The sensor signal processor 12 may be realized by sensor signal processing circuitry.

The sensor output corrector 14 is an example of a corrector. The sensor output corrector 14 may be realized by sensor output correcting circuitry.

The sensor output corrector 14 includes a determiner 142, a calculator 144, a storage 146, and a subtractor 148.

The determiner 142 may be realized by determination circuitry. The determiner 142 determines a difference between the detected orientation indicated by the orientation information and an orientation indicated by average information, which will be described later. The detected orientation and the orientation indicated by the average information are numerical values. The difference is indicated in numerical values that increase with an increase in the difference. The determiner 142 determines whether the difference is less than a threshold value. The orientation information and the average information include information on the elevation angle and information on the horizontal angle. That "the difference is less than the threshold value" means that the angle between the detected orientation indicated in the orientation information and the orientation indicated in the average information, for example, is less than the angle corresponding to the threshold value.

When the difference is less than the threshold value, the determiner 142 outputs the orientation information to the calculator 144. When the difference is equal to or greater than the threshold value, the determiner 142 discards the orientation information without outputting the orientation information to the calculator 144.

The calculator 144 may be realized by calculation circuitry. The calculator 144 accumulates pieces of orientation information over 15 seconds. It should be noted that 15 seconds is an example of the prescribed period. The calculator 144 generates the average information by averaging values indicated by the accumulated pieces of orientation information. The average information corresponds to the orientation offset. To average the values indicated by the pieces of orientation information means both to average the elevation angles indicated in the pieces of orientation information and to average the horizontal angles indicated in the pieces of orientation information. The calculator 144 stores the average information in the storage 146.

The subtractor 148 may be realized by subtraction circuitry. The subtractor 148 subtracts the value indicated by the average information from a value indicated by a latest piece of orientation information, thereby to correct the orientation information (hereafter, "corrected orientation information"). For example, the subtractor 148 subtracts an elevation angle indicated by the average information from an elevation angle indicated by the latest piece of orientation information and subtracts a horizontal angle indicated by the average information from a horizontal angle indicated by the latest piece of orientation information to generate the corrected orientation information.

To subtract the value indicated by the average information from the value indicated by the latest piece of orientation information means to remove the offset in orientation from the orientation detected most recently. Therefore, the corrected orientation information accurately indicates the head orientation of the listener L wearing the headphones 1.

The head-related-transfer-function reviser 16 may be realized by head-related-transfer-function revising circuitry. The head-related-transfer-function reviser 16 determines the head-related-transfer function based on the corrected orientation information. The head-related-transfer-function reviser 16 is an example of a determiner. The head-related-transfer-function reviser 16 determines the head-related-transfer function to be provided to the sound-image-localization processor 26. The head-related-transfer-function reviser 16 generates a revised head-related-transfer function by revising, based on the corrected orientation information, a head-related-transfer function prepared in advance. The revised head-related-transfer function is the head-related-transfer function to be provided to the sound-image-localization processor 26. When the head orientation of the listener L is in the direction A, the head-related-transfer function before revision is indicative of the propagation property of sound that traveled from each of five sound sources to the head (the external auditory canal or the ear drum) of the listener L. The positions of the five sound sources are the positions of the five sound images corresponding to the five channels.

FIG. 7 is a simplified diagram showing, in plain view, the positional relationships between the listener L and the five sound images realized by the head-related-transfer function before revision.

The five sound images are, for example, 3 in distant from the listener L, and correspond to the five channels on a one-to-one basis. The sound image of the front left channel FL is positioned at polar coordinates (30, 0). The sound image of the front center channel FC is positioned at polar coordinates (0, 0). The sound image of the front right channel FR is positioned at polar coordinates (−30, 0). The sound image of the rear left channel RL is positioned at polar coordinates (115, 0). The sound image of the rear right channel RR is positioned at polar coordinates (−115, 0). The head-related-transfer-function reviser 16 may determine the head-related-transfer function before revision on the basis of the measurement results of the sound transmitted to the listener L from five real sound sources arranged at the positions of the five sound images. The head-related-transfer-function reviser 16 may generate the head-related-transfer function before revision by modifying a general head-related-transfer function on the basis of the characteristic of the listener L.

Note that the general head-related-transfer function is determined based on the measurement results of the sound transmitted from the five real sound sources arranged at the positions of the five sound images to each of a great number of people at the position of the listener L.

A reason for revising the head-related-transfer function, using the corrected orientation information, will now be described. For example, it is assumed that the head orientation of the listener L changes from the direction A shown in FIG. 7 to a direction B shown in FIG. 8. The direction B has a horizontal angle rotated from the direction A by −θc (degrees). If the head-related-transfer function is not revised in this situation, as shown in FIG. 8, the positions of the sound images move from positions marked with black circles to positions marked with white circles, following the change in head orientation of the listener L. Such move of the sound images does not occur in a situation in which the listener L does not wear the headphones 1. Therefore, such moving of the sound images greatly impairs the sense of the listener L in sound image localization.

Thus, the head-related-transfer-function reviser 16 revises the head-related-transfer function in accordance with the head orientation of the listener L such that the positions of the sound images do not move even if the head of the listener L rotates. For example, when the listener L rotates the head by −θc (degrees) at the horizontal angle, the head-related-transfer-function reviser 16 revises the head-related-transfer function such that the positions of the sound images (positions marked with the white circles) are localized at the positions rotated by +θc (degrees) at the horizontal angle (positions marked with the black circles).

Although the case in which the head orientation of the listener L rotates only in the horizontal orientation is described as an example for simplifying explanation, it is also the same for a case in which the head orientation of the listener L rotates only in the elevation orientation and a case in which the head orientation of the listener L rotates in the horizontal orientation and the elevation orientation.

Returning to FIG. 1, the sound-image-localization processor 26 is an example of a signal processor. The sound-image-localization processor 26 may be realized by sound-image-localization processing circuitry. The sound-image-localization processor 26 generates stereo signals of two channels by applying the revised head-related-transfer function to the audio signals of five channels. The stereo signals of two channels include a left-channel signal and a right-channel signal.

The DAC (Digital to Analog Converter) 32L converts the left-channel signal to an analog left-channel signal. The amplifier 34L amplifies the analog left-channel signal. The left speaker driver 42L is mounted on the headphone unit 40L. The left speaker driver 42L converts the amplified left-channel signal to air vibrations, that is, to sound. The left speaker driver 42L emits the sound toward the left ear of the listener L.

The DAC 32R converts the right-channel signal to an analog right-channel signal. The amplifier 34R amplifies the analog right-channel signal. The right speaker driver 42R is mounted on the headphone unit 40R. The right speaker driver 42R converts the amplified right-channel signal to the sound. The right speaker driver 42R emits the sound to the right ear of the listener L.

Next, operations of the headphones 1 according to the embodiment will be described.

The operations related to the characteristic of the headphones 1 can be divided mainly into two processes, that is, an offset-value calculation process and a sound-image-localization process. In the offset-value calculation process, the headphones 1 calculate the offset in orientation by averaging a plurality of detected orientations indicated by pieces of orientation information and then generate the average information indicative of the offset in orientation. The pieces of orientation information are calculated by the sensor signal processor 12 while the listener L wears the headphones 1.

The sound-image-localization process includes a first process, a second process, and a third process. In the first process, the headphones 1 generate the corrected orientation information by correcting the detected orientation calculated by the sensor signal processor 12, using the offset in orientation. In the second process, the headphones 1 revise the head-related-transfer function based on the corrected orientation information. In the third process, the headphones 1 use the revised head-related-transfer function to cause the listener L to localize the sound image.

The offset-value calculation process and the sound-image-localization process are repeatedly executed over a period in which the listener L wears the headphones 1 on the head, for example. The offset-value calculation process and the sound-image-localization process may be repeatedly executed after a power switch (not shown) is turned on.

The offset-value calculation process and the sound-image-localization process may be started when the AIF 22 receives audio signals. The offset-value calculation process and the sound-image-localization process may be started in response to an instruction or an operation of the listener L.

Figure 2:
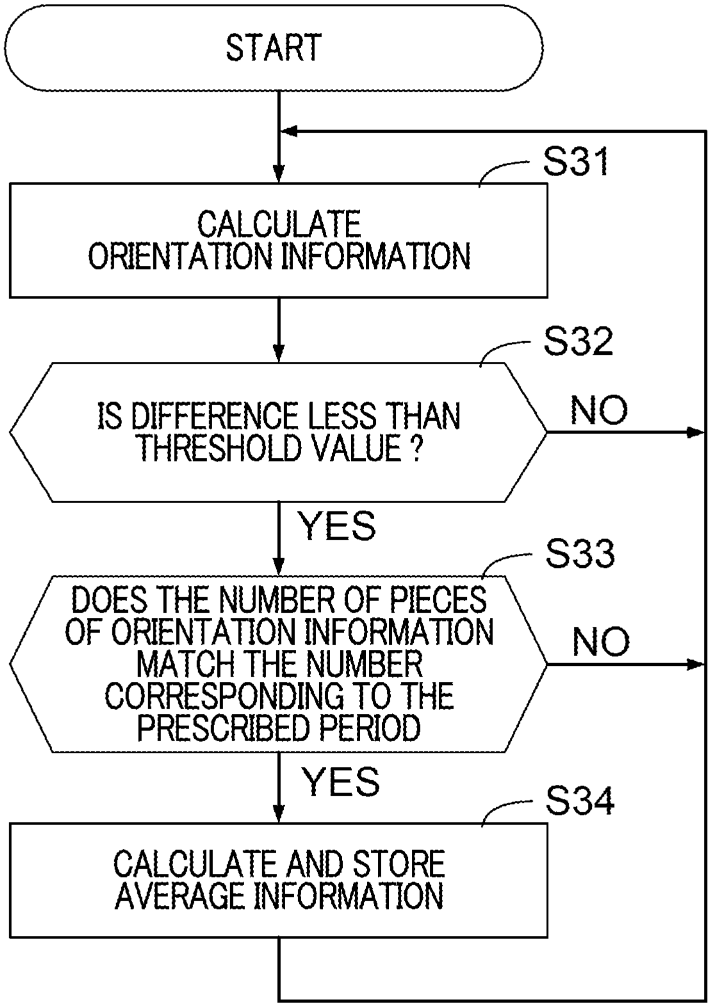
FIG. 2 is a flowchart showing offset-value calculation processing of the audio processing apparatus.

FIG. 2 is a flowchart showing the offset-value calculation process. The offset-value calculation process in the embodiment is repeatedly executed over a period in which the listener L wears the headphones 1.

First, the sensor signal processor 12 sequentially acquires detection signals of the sensor 5. Based on the detection signal, the sensor signal processor 12 sequentially calculates, at 0.5 second intervals, pieces of orientation information each indicative of the orientation of the sensor 5, that is, the head orientation of the listener L (step S31).

Then, the determiner 142 determines whether or not the difference between the value indicated by the latest piece of orientation information and the value indicated by the average information is less than the threshold value (step S32).

When step S32 is executed for the first time after the power switch is turned on, the average information is not stored in the storage 146. In such a case, the determiner 142 uses the polar coordinates (0, 0) as the initial value of the average information.

The determiner 142 supplies the latest piece of orientation information to the calculator 144 when the difference is less than the threshold value ("Yes" as the result of determination in step S32). When the difference is equal to or more than the threshold value ("No" as the result of determination in step S32), the processing procedure is returned to step S31. In this case, the latest piece of orientation information is not supplied to the calculator 144.

Then, the determiner 142 determines whether or not the number of pieces of the orientation information calculated by the sensor signal processor 12 matches the number corresponding to the prescribed period (step S33). For example, if the prescribed period is 15 seconds in a situation in which the sensor signal processor 12 calculates the orientation information at 0.5 second intervals, the number of pieces of orientation information calculated by the sensor signal processor 12 in 15 seconds is "30". In this case, the number corresponding to the prescribed period is "30". In step S33, the determiner 142 determines whether or not the number of pieces of orientation information calculated by the sensor signal processor 12 is "30".

When the number of pieces of orientation information calculated by the sensor signal processor 12 is less than the number corresponding to the prescribed period ("No" as the result of determination in step S33), the processing procedure is returned to step S31.

In the meantime, when the number of pieces of orientation information calculated by the sensor signal processor 12 is the number corresponding to the prescribed period ("Yes" as the result of determination in step S33), the calculator 144 calculates the average information and stores the average information in the storage 146 (step S34). For example, the calculator 144 first generates a total value by summing up values indicated by the pieces of orientation information supplied from the determiner 142. Next, the calculator 144 calculates the average information by dividing the total value by the number of the pieces of orientation information supplied from the determiner 142. In this way, the calculator 144 divides the total value not by "30", which is the number corresponding to the prescribed period, but by the number of pieces of orientation information supplied from the determiner 142. The reason is that each of the pieces of the orientation information that indicates a value in which difference from the value indicated by the average information is equal to or greater than the threshold value is not supplied to the calculator 144.

After step S34, the number of pieces of orientation information calculated by the sensor signal processor 12 is cleared (step thereof is omitted), and then the processing procedure is returned to step S31.

Steps S31 to S34 are repeatedly executed at 0.5 second intervals after the power switch is turned on, for example. With such repetitions, the average information (information showing errors in the elevation angle and the horizontal angle) is calculated at predetermined time intervals, and the average information is updated in the storage 146.

Figure 3:
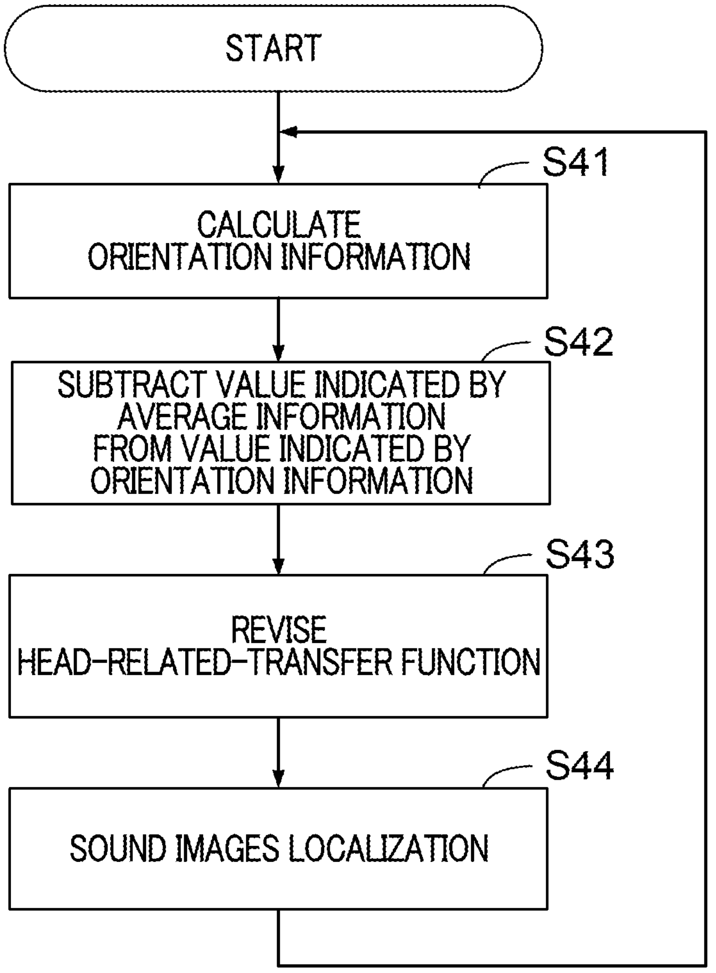
FIG. 3 is a flowchart showing sound-image-localization processing of the audio processing apparatus.

FIG. 3 is a flowchart showing the sound-image-localization process.

First, the sensor signal processor 12 acquires the detection signal output from the sensor 5. The sensor signal processor 12 sequentially calculates pieces of orientation information based on the detection signal at 0.5 second intervals (step S41). Step S41 is substantially the same as step S31 of the offset-value-calculation process.

Then, the subtractor 148 generates the corrected orientation information by subtracting the value indicated by the average information from the value indicated by the latest piece of the orientation information (step S42).

That is, the subtractor 148 generates the corrected orientation information by amending the latest detected orientation on the basis of the offset in orientation. For example, the subtractor 148 generates the corrected orientation information by subtracting the error in the elevation angle indicated by the average information from the elevation angle indicated by the latest piece of the orientation information and by subtracting the error in the horizontal angle indicated by the average information from the horizontal angle indicated by the latest piece of the orientation information. The corrected orientation information indicates the error in orientation acquired by eliminating the error caused by drift, that is, the offset from the latest detected orientation. Therefore, the corrected orientation information accurately indicates the head orientation of the listener L.

The head-related-transfer-function reviser 16 revises the head-related-transfer function such that the positions of the sound images are changed in accordance with the orientation indicated by the corrected orientation information (step S43).

The sound-image-localization processor 26 performs sound-image-localization processing on the audio signals of five channels (step S44). For example, the sound-image-localization processor 26 revises the audio signals of five channels by applying the revised head-related-transfer function to the audio signals of five channels. The sound-image-localization processor 26 converts the revised audio signals of five channels into audio signals of two channels.

After step S44, the processing procedure is returned to step S41. Steps S41 to S44 are repeatedly executed at 0.5 second intervals, and the positions of the sound images are changed, as appropriate, on the basis of the detected orientation.

According to the embodiment, even if the head orientation of the listener L changes from the direction A to the direction B, the positional relationships between the listener L and the sound images do not change. Thus, the embodiment can suppress the loss in sense of sound image localization of the listener L. Furthermore, the embodiment can reduce the influence of error, which is due to drift or the like, upon detection of the head orientation of the listener L. Therefore, the head orientation of the listener L can be detected accurately. Consequently, it is possible to cause the listener L to localize the sound images that are the virtual sound sources at more accurate positions compared to the configuration in which the error is not eliminated.

The disclosure is not limited to the embodiment described above. The disclosure may be variously modified as described hereinafter. Furthermore, each of the embodiments and each of the modification examples may be combined with one another as appropriate.

In the embodiment, the offset-value calculation process is repeatedly executed during the period in which the listener L wears the headphones 1. There may be a case in which drift due to the detection signal output from the sensor 5 is stable after a certain length of time (for example, 30 minutes). For example, while the temperature of the sensor 5 increases after the power is turned on, the temperature becomes almost stable after some length of time. The drift due to the detection signal output from the sensor 5 has temperature dependency, so that the error due to the drift becomes almost stable if the temperature of the sensor 5 becomes almost stable.

Therefore, the offset-value calculation process may be stopped at the timing when such time has elapsed from the timing when the listener L puts on the headphones 1.

For example, when such time has elapsed, the determiner 142 may stop determining whether or not the difference between the value indicated by the latest piece of orientation information and the value indicated by the average information is less than the threshold value. The calculator 144 may stop updating the average information when such time has elapsed.

With such configuration, the power consumption can be decreased since the offset-value calculation process is stopped.

When the offset-value calculation process is stopped, the subtractor 148 may subtract, from the value indicated by the latest piece of orientation information, the value indicated by the average information stored last in the storage 146.

In the embodiment, the sensor output corrector 14 calculates the average information by averaging values indicated by pieces of orientation information calculated by the sensor signal processor 12 in 15 seconds. When listening to the sound emitted from the headphones 1, the listener L tends to maintain the head orientation. Therefore, it is sufficient that the predetermined period be 10 seconds or more.

There may be cases in which the positions of the virtual sound sources that are the sound images do not need to be corrected accurately in a situation, depending on certain kinds, types, and characteristics of the sound emitted from the headphones 1. Examples of such sound may be daily conversation and ambient music not intended to be heard in a focused manner.

Therefore, a switch for canceling the offset-value calculation process and/or revision of the head-related-transfer function may be provided to the external terminal apparatus 200, and the operation of the headphones 1 may be controlled according to the operation of the switch, for example. For example, a receiver (not shown) may receive the operation state of the switch, and execution of the offset-value calculation process by the sensor output corrector 14 and/or revision of the head-related-transfer function by the head-related-transfer-function reviser 16 may be prohibited according to the operation state.

Furthermore, based on the result of analysis of the audio signals of two channels received by the AIF 22, a part of, or all of, execution of the offset-value calculation process, revision of the head-related-transfer function, and execution of the sound-image-localization process may be prohibited. When a consistent level of the phases and amplitudes of the audio signals of two channels is high (equal to or greater than the threshold value), the sound is monaural or nearly monaural. Therefore, the positions of the sound sources are unimportant in this situation.

When the detected orientation is extremely different from the direction A indicated by the average information, the calculation amount for revising the head-related-transfer function may be increased, or the head-related-transfer function may not be revised accurately. Thus, the head-related-transfer function may not be revised when the difference between the value indicated by the latest piece of orientation information and the value indicated by the average information is equal to or greater than the threshold value. In such a case, a warning that indicates "no revision" may be given to the listener L from the headphones 1 or the external terminal apparatus 200.

In the embodiment, the head-related-transfer-function reviser 16 revises the head-related-transfer function each time the detected orientation is acquired. The listener L who wears the headphones 1 continues to face in the direction A as described above. Therefore, the head-related-transfer function may not be revised when the difference between the value indicated by the latest detected orientation and the value (the direction A) indicated by the average information is less than the threshold value. The head-related-transfer function may be revised when the difference is equal to or greater than the threshold value.

When the amount of chronological change in the detected orientation is small, the revision frequency may be set low. Conversely, when the amount of change is large, the revision frequency may be set high.

In addition to the head orientation of the listener, the sound-image-localization process may be executed based further on the angles of the neck, for example.

Although the case of applying the audio processing apparatus to the headphones 1 has been described, the audio processing apparatus may be applied to earphones with no headband, such as an in-ear-canal-type earphone inserted into the auricle of the listener, and an intra-concha-type earphone placed at the concha of the listener.

The audio processor 1*a* and the storage 1*b* may be included in the external terminal apparatus 200. At least one of the sensor signal processor 12, the sensor output corrector 14, the head-related-transfer-function reviser 16, the AIF 22, the upmixer 24, and the sound-image-localization processor 26 may be included in an apparatus that is different from the headphones 1, such as the external terminal apparatus 200. If the external terminal apparatus 200 includes the head-related-transfer-function reviser 16, the upmixer 24, and the sound-image-localization processor 26, the headphones 1 transmits the corrected orientation information to the external terminal apparatus 200. The external terminal apparatus 200, including the head-related-transfer-function reviser 16, the upmixer 24, and the sound-image-localization processor 26, determines a head-related-transfer function based on the corrected orientation information, and generates the audio signals using the head-related-transfer function, and transmits the generated audio signals to the headphones 1. The headphones 1 emit sound based on the generated audio signals.

Supplementary Notes:

From the embodiments and the like described above, the following aspects, for example, can be found.

First Aspect:

An audio processing apparatus according to a first aspect of the present disclosure includes: a sensor configured to output a detection signal in accordance with a posture of the sensor; at least one processor; and a memory coupled to the at least one processor for storage of instructions executable by the at least one processor and that upon execution cause the at least one processor to: sequentially generate, based on the detection signal, pieces of orientation information, each indicative of an orientation of the sensor; correct, based on average information, a latest piece of orientation information among the sequentially generated pieces of orientation information, to generate corrected orientation information, the average information being acquired by averaging values indicated by a plurality of pieces of orientation information among the sequentially generated pieces of orientation information; determine a head-related-transfer function in accordance with the corrected orientation information; and perform, based on the head-related-transfer function, sound-image-localization processing on an audio signal.

According to the first aspect, even if drift occurs, the head orientation of the listener can be acquired accurately. Therefore, it is possible to localize the sound image at an accurate position by appropriately correcting the head-related-transfer function.

Second Aspect:

The audio processing apparatus of the first aspect according to a second aspect, in generating the corrected orientation information, the at least one processor is configured to generate the corrected orientation information by subtracting a value indicated by the average information from a value indicated by the latest piece of orientation information. According to the second aspect, the orientation information can be corrected with a simple processing in which the value indicated by the average information is subtracted from the value indicated by the orientation information.

Third Aspect:

In the audio processing apparatus of the first or second aspect according to a third aspect, the at least one processor is further configured to generate the average information by using, as the plurality of pieces of orientation information, pieces of orientation information generated within a period of at least 10 seconds among the sequentially generated pieces of orientation information. If the time used for averaging the values is too short, a small change in the head orientation cannot be ignored. However, with the time of 10 seconds or more, the small change can be ignored.

Fourth Aspect:

In the audio processing apparatus of any one of the first to third aspects according to a fourth aspect, the at least one processor is further configured to: determine whether a difference between a value indicated by the latest piece of orientation information and a value indicated by the average information is less than a threshold value; and update the average information by using the latest piece of orientation information, when the difference is less than the threshold value.

According to the fourth aspect, the orientation information indicative of an orientation that is extremely different from the orientation indicated by the average orientation or the orientation information that is influenced by unexpected noise or the like is not used to calculate the average. Therefore, the reliability of the average information can be increased.

Fifth Aspect:

In the audio processing apparatus of the fourth aspect according to a fifth aspect, the at least one processor is further configured to: stop determining whether the difference is less than the threshold value when a prescribed time has elapsed from a start of output of the audio signal; and stop updating the average information when the prescribed time has elapsed from the start of output of the audio signal. In a case in which drift is stable after a certain length of time, there is almost no change in the error after such time has elapsed. Therefore, it is unnecessary to update the average information. When averaging the values indicated by the pieces of orientation information is stopped, the power consumption can be decreased.

Sixth Aspect:

In the audio processing apparatus of the first to fifth aspects according to a sixth aspect, the correction of the latest piece of orientation information is settable to be enabled or disenabled. There may be cases in which it is unnecessary to execute the sound-image-localization process depending on the kinds, types, characteristics, and the like of the sound that is played. In such a case, the power that would have been consumed can be saved by setting the correction to not be in effect.

To be in effect or to not be in effect may be set by an operation by the listener of the switch (a setter) 1*c* or the like, or may be set according to the result of analysis of the audio signals.

Seventh to Eighteenth Aspects:

An audio processing method according to any one of seventh to eighteenth aspects corresponds to the audio processing apparatus of any one of the first to sixth aspects.

DESCRIPTION OF REFERENCE SIGNS

1: headphones, 3: headband, 5: sensor, 12: sensor signal processor, 14: sensor output corrector, 16: head-related-transfer-function reviser, 26: sound-image-localization processor, 42L, 42R: speaker driver, 142: determiner, 144: calculator, 146: storage, and 148: subtractor.

What is claimed is:

1. An audio processing apparatus comprising:
- a sensor configured to output a detection signal in accordance with an orientation of the sensor;
- a memory storing instructions; and
- at least one processor that implements the instructions to:
  - sequentially generate, based on the detection signal, orientation information pieces each indicative of the orientation of the sensor;

correct a current orientation information piece based on an average of a first plurality of orientation information pieces, among the sequentially generated orientation information pieces, and generate a corrected current orientation information piece;

determine a head-related-transfer function in accordance with the corrected current orientation information piece; and apply a sound-image-localization processing to an audio signal based on the determined head-related-transfer function.

2. The audio processing apparatus according to claim 1, wherein the at least one processor generates the corrected current orientation information piece by subtracting a value indicated by the average from a value indicated by the current orientation information piece.

3. The audio processing apparatus according to claim 1, wherein the at least one processor implements the instructions to generate the average using, as the first plurality of orientation information pieces, orientation information pieces generated within a period of at least 10 seconds, among the sequentially generated orientation information pieces.

4. The audio processing apparatus according to claim 1, wherein the at least one processor implements the instructions to:

determine whether a difference between a value indicated by the current orientation information piece and a value indicated by the average is less than a predetermined threshold value; and update the average using the current orientation information piece, upon the difference being less than the predetermined threshold value.

5. The audio processing apparatus according to claim 4, wherein the at least one processor implements the instructions to:

end the determining of whether the difference is less than the predetermined threshold value, upon a lapse of a predetermined time from a start of outputting of the audio signal; and end the updating of the average, upon the lapse of the predetermined time.

6. The audio processing apparatus according to claim 1, wherein:

the at least one processor implements the instructions to selectively apply an enable or a disable setting of the correction of the current orientation information piece, and the at least one processor correct the current orientation information piece, upon the enable setting being selectively applied.

7. An audio processing system comprising:

a sensor configured to output a detection signal in accordance with an orientation of the sensor;

a memory storing instructions; and at least one processor that implements the instructions to:

sequentially generate, based on the detection signal, orientation information pieces each indicative of the orientation of the sensor;

correct a current orientation information piece based on an average of a first plurality of orientation information pieces, among the sequentially generated pieces of orientation information, and generate a corrected current orientation information piece;

determine a head-related-transfer function in accordance with the corrected current orientation information piece; and apply a sound-image-localization processing to an audio signal based on the determined head-related-transfer function.

8. The audio processing system according to claim 7, wherein the at least one processor generates the corrected current orientation information piece by subtracting a value indicated by the average from a value indicated by the current orientation information.

9. The audio processing system according to claim 7, wherein the at least one processor implements the instructions to generate the average using, as the first plurality of orientation information pieces, orientation information pieces generated within a period of at least 10 seconds, among the sequentially generated orientation information pieces.

10. The audio processing system according to claim 7, wherein the at least one processor implements the instructions to:

determine whether a difference between a value indicated by the current orientation information piece and a value indicated by the average is less than a predetermined threshold value; and update the average using the current orientation information piece, upon the difference being less than the predetermined threshold value.

11. The audio processing system according to claim 7, wherein the at least one processor implements the instructions to:

end the determining of whether the difference is less than the predetermined threshold value, upon a lapse of a predetermined time from a start of outputting of the audio signal; and end the updating of the average upon the lapse of the predetermined time.

12. The audio processing system according to claim 7, wherein:

the at least one processor implements the instructions to selectively apply an enable or a disable setting of the correction of the current orientation information piece, and the at least one processor corrects the current orientation information piece upon the enable setting being selective applied.

13. An audio processing method comprising:

sequentially generating, based on a detection signal from a sensor indicating an orientation of the sensor, orientation information pieces each indicative of the orientation of the sensor;

correcting a current orientation information piece based on an average of a first plurality of orientation information pieces, among the sequentially generated orientation information pieces, and generate a corrected current orientation information piece;

determining a head-related-transfer function in accordance with the corrected current orientation information piece; and applying a sound-image-localization processing to an audio signal based on the determined head-related-transfer function.

14. The audio processing method according to claim 13, wherein the generating of the corrected current orientation information generates the corrected current orientation information piece by subtracting a value indicated by the average from a value indicated by the current orientation information piece.

15. The audio processing method according to claim 13, further comprising generating the average using, as the first plurality of orientation information pieces, orientation information pieces generated within a period of at least 10 seconds, among the sequentially generated orientation information pieces.

16. The audio processing method according to claim 13, further comprising:

determining whether a difference between a value indicated by the current orientation information piece and a value indicated by the average is less than a predetermined threshold value; and updating the average using the current orientation information piece, upon the difference being less than the predetermined threshold value.

17. The audio processing method according to claim 13, further comprising:

ending the determining of whether the difference is less than the predetermined threshold value, upon a lapse of a predetermined time from a start of outputting of the audio signal; and ending the updating of the average, upon the lapse of the predetermined time.

18. The audio processing method according to claim 13, further comprising:

selectively applying an enable or a disable setting of the correction of the current orientation information piece, wherein the correcting of the current orientation information piece corrects the current orientation information piece, upon the enable setting being selectively applied.

* * * * *